May 3, 1966  R. G. BOARD ETAL  3,249,386
RETRACTABLE SAFETY BELTS
Filed April 17, 1963  2 Sheets-Sheet 1
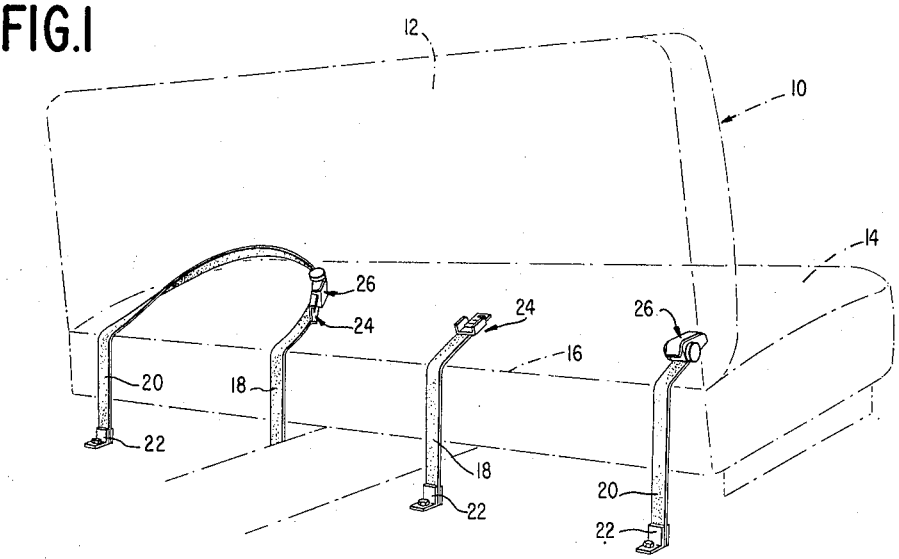
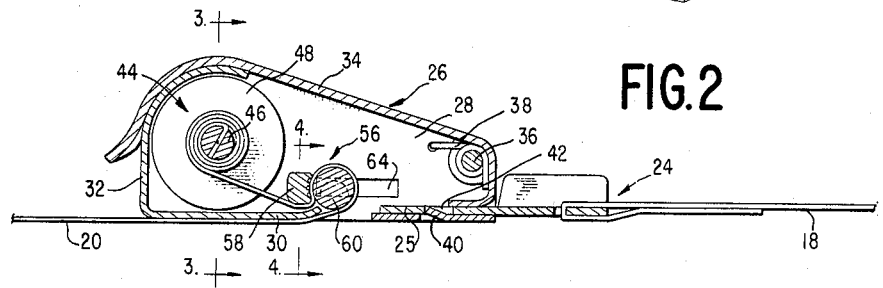
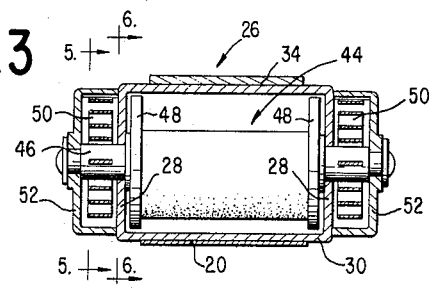
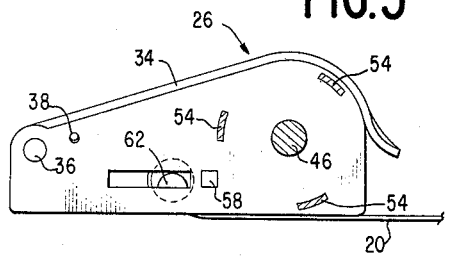
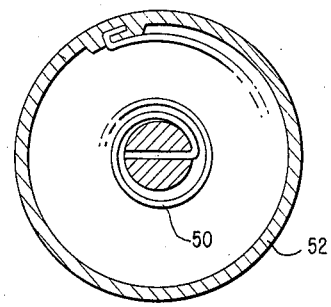
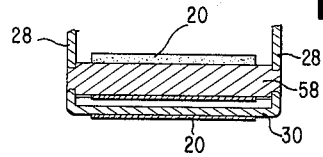
INVENTORS
RICHARD G. BOARD
NELSON H. SHAPIRO
BY
*Shapiro and Shapiro*
ATTORNEYS May 3, 1966 R. G. BOARD ETAL 3,249,386
RETRACTABLE SAFETY BELTS
Filed April 17, 1963 2 Sheets-Sheet 2
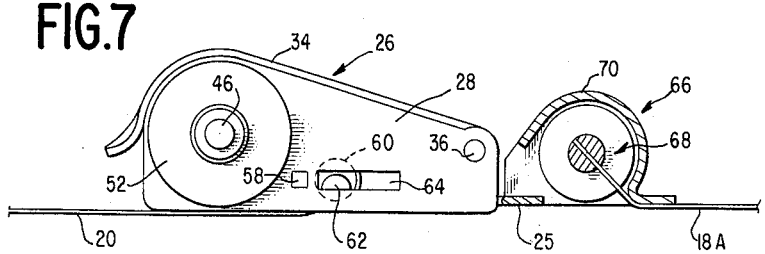
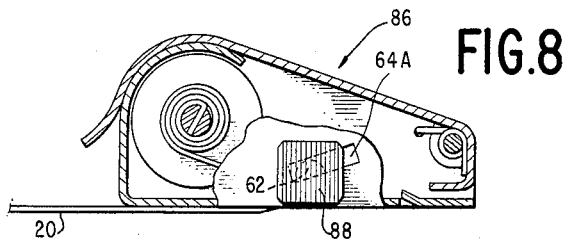
INVENTORS
RICHARD G. BOARD
BY NELSON H. SHAPIRO
*Shapiro and Shapiro*
ATTORNEYS

United States Patent Office 3,249,386
Patented May 3, 1966

3,249,386
RETRACTABLE SAFETY BELTS
Richard G. Board, 3000 Connecticut Ave., Bethesda, Md., and Nelson H. Shapiro, 801 Washington Bldg., Hyattsville, Md.
Filed Apr. 17, 1963, Ser. No. 273,696
5 Claims. (Cl. 297—388)

This invention relates to retractable safety belts, and more particularly to so-called "seat-belts" for use in automotive vehicles.

The use of passenger-restraining seat belts in automotive vehicles has burgeoned because of increasing public awareness of the effectiveness of the belts in reducing the number and severity of collision injuries. Seat belts are being offered as standard equipment or low cost options by the manufacturers of substantially all domestic automobiles, and there is a competitive market for the manufacture and distribution of seat belts for used as well as new vehicles.

Perhaps the most significant deterrent to the acquisition of seat belts or to use the seat belts once acquired is the inconvenience of having the belts lie helter-skelter upon the seat when not in use. It is almost impossible to avoid sitting upon the belt when entering the vehicle. The extraction of the belt to place it in operative position is a burdensome procedure, especially when the vehicle occupant is wearing heavy clothing. Moreover, the loose condition of the belts when not in use permits the belts to become caught in the vehicle doors and to slide through the opening between the back and lower portions of the seat. Finally, the unattractiveness of seat belts in disarray is self-evident to anyone who has observed this condition.

In an effort to overcome the foregoing disadvantages of seat belts, various proposals have been made for the provision of belts which may be retracted when not in use. For example, it has been proposed to install a resiliently actuated self-winding reel in, under, behind, or beside the seat, or even in the adjacent vehicle structure, such as the doors. However, such proposals have proved to be impractical or unsound, because of the expense of manufacturing and installing reels capable of withstanding collision forces, the lack of aesthetic appeal of the resultant installation, and the need for cumbersome and complex control linkages to permit the reels to be locked with different lengths of exposed belt. It has also been proposed to employ an inertial reel, which permits the belt to be withdrawn under moderate pull, but which locks when a sudden strong force is applied to the belt. However, such reels are complex, expensive, unreliable, and permit the belt to be loosened in a slow deceleration of the vehicle which may precede a collision. Furthermore, when floor-mounted reels are employed in a conventional belt arrangement, with the belts passing between the back and lower portion of the seat, there is constant rubbing of the belt against the seat as the belt is extended and retracted.

A further prior proposal involves the use of a spring-biased idler roller over which the belt passes beneath the seat. Aside from being cumbersome and difficult to install in conventional vehicles, this proposal requires that the belt be extended fully for use, so that the belt is taut between the buckle fastener and the floor anchorage and so that the idler roller is not subjected to the force of a collision.

Still another prior proposal is to employ double-flight perforated belts which are retracted by a floor mounted reel or a resilient biased idler roller, and which are drivingly engaged with studded rollers or cobs in the belt fastener parts, so that the movement of the flights of the perforated belts through the fastener parts may be arrested by locking protrusions which prevent rotation of the cobs. This proposal has the disadvantages of requiring special belts, the perforations of which are subjected to wear in use, and of requiring double length belts and large reels or long throw idlers for retracting the double belt length. The proposal also suffers from the need for special guides to insure proper movements of the belt, the need for pivotal floor brackets to accommodate seat movement, the need for highly specialized fastener hardware, and the need for passing the belts upwardly around the sides of the seat because of the impracticality of passing long, moving, double flights of belt through the seat.

Accordingly, it is a principal object of the present invention to provide improved seat belts and the like which are retractable when not in use and which obviate most or all of the disadvantages set forth above.

More specifically, it is an object of the present invention to provide seat belts and the like having belt-retracting reels which are associated with the belt fastener devices.

Another object of the invention is to provide seat belts and the like which are constructed so as to provide retraction and extension without requiring control linkages or inertial reels.

A further object of the invention is to provide retractable seat belts and the like installed so as to pass between the back and lower portions of a seat, but without movement of the belt through the seat during retraction or extension of the belt.

Still another object of the invention is to provide improved seat belts and the like of the foregoing type which may utilize conventional imperforate belt material in conjunction with belt hardware which need not be drastically different from existing hardware.

Yet another object of the invention is to provide seat belts and the like of the foregoing type which may be utilized in existing automotive vehicles without modification of the vehicle and which may employ existing or conventional mounting brackets, and even existing installed belt material.

An additional object of the invention is to provide seat belts and the like of the foregoing type constructed so that collision forces are not applied to the retracting reel or the retracting reel housing.

A still further object of the invention is to provide seat belts and the like of the foregoing type in which the belt material is substantially self-aligning as it is wound onto a retracting reel.

Yet another object of the invention is to provide seat belts and the like employing conventional components and yet so arranged that the belt may be withdrawn from a reel, fastened at desired length, released, and automatically retracted, all without control linkages and without subjecting the reel to collision forces.

An additional object of the invention is to provide improved hardware for use in seat belts and the like, including fasteners and reels.

More specifically, it is an object of the present invention to provide belt fasteners and the like incorporating reels, and in which additional elements may be utilized to fix the position of the fastener device upon a belt.

Another specific object of the invention is to provide devices of the foregoing type in which a pull upon the belt fastener automatically locks the fastener in position upon the belt.

A still further object of the invention is to provide devices in which the engagement of mating fastener parts automatically locks one or more of the parts to the belt.

Another object of the invention is to provide devices of the foregoing type in which the locking action permits further retraction but not extension of the belt.

Briefly stated, and without limiting the scope of the invention, the present invention in one embodiment comprises a two-strap seat belt, one of the straps of which has a buckle or fastener provided with a self-winding reel for winding up the fastener-end of the strap, and in so doing, moving the fastener toward the other end of the strap. If the fastener is engaged with a mating fastener to complete the belt, further extension of the belt is prevented by a mechanism which locks the fastener in position upon the strap.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein:

FIGURE 1 is a perspective view, partly in phantom lines, illustrating one form of seat belt installation in accordance with the invention;

FIGURE 2 is a longitudinal sectional view of one form of the invention in which a reel is associated with a buckle;

FIGURE 3 is a sectional view taken along line 3—3 of FIGURE 2;

FIGURE 4 is a sectional view taken along line 4—4 of FIGURE 2;

FIGURE 5 is a sectional view taken along line 5—5 of FIGURE 3;

FIGURE 6 is a sectional view taken along line 6—6 of FIGURE 3;

FIGURE 7 is a partially sectional side elevation illustrating the engagement of two fasteners of the invention, each having a reel; and FIGURE 8 is a longitudinal sectional view illustrating a modified embodiment.

In the drawings, proportions are varied for clarity of illustration.

Seat belt installations commonly employed in automotive vehicles comprise a pair of straps for each occupant. The straps have one end anchored to the vehicle floor at spaced locations behind the seat and pass upwardly through the opening at the crotch of the seat onto the lower portion of the seat. The other end of each strap is provided with a fastener. It is common practice to utilize a buckle-type fastener on one strap and a tongue-type fastener on the other strap, the belt encircling the user when the fasteners are locked together. In order to provide for adjustability to accommodate different girth, the strap associated with the buckle is usually extra long and the position of the buckle on the strap is adjustable by means of a clamp or the like. The strap adjacent the door of the vehicle is kept short to minimize the possibility of catching the strap in the door. When not in use, the belts lie loosely upon the seat.

The present invention is especially useful in seat belt installations in which the straps pass through the crotch of the seat, but the invention is not limited to such use. FIGURE 1 of the drawings illustrates an embodiment of the invention with a through-the-seat installation, the seat 10 having an upper or back portion 12, a lower portion 14, and an opening at crotch 16 through which the straps pass. Two seat belts are illustrated, each comprising a strap 18 adjacent the center portion of the seat and a strap 20 adjacent the outer portion of the seat. One end of the straps is anchored to the floor behind and below the seat by conventional anchor hardware 22. The straps may be formed of the conventional nylon webbing or of any other conventional or suitable strap material. In the illustrated embodiment the straps 20 are made retractable in a manner to be described. Straps 18 are of fixed length but are kept quite short so as to be unobstrusive. The free end of straps 18 is attached to a tonque-fastener 24. The free end of the straps 20 is provided with a buckle-fastener 26 having a strap storage reel, as will be described. When the mating fasteners are engaged, the belt is completed as illustrated at the left side of FIGURE 1. When the fasteners are disengaged, the straps assume the positions shown at the right side of FIGURE 1, strap 20 being retracted into the housing of the buckle 26, which causes the buckle to move to the crotch of the seat.

As shown in FIGURE 2, the buckle 26 has a housing or casing comprising side walls 28, bottom wall 30, and rear wall 32. A buckle operating lever 34 forms the top-front wall of the housing and is pivotally mounted upon the side walls by means of a pin 36 extending through the side walls and adjacent ears of the lever. One end of lever 34 is turned inwardly into the housing in spaced relation to the bottom wall, so as to define an access opening, while the other end of the lever is shaped for convenient finger actuation. The lever is normally biased to the position illustrated by means of a torsion spring 38 wound about pin 36 and having its ends engaging the lever and a side wall respectively. One or more locking projections 40 are formed by indenting portions of the bottom wall. These projections form part of the actual fastener means by which the belt is completed.

The tongue 25 of mating fastener 24 has an aperture 42 which fits over the projections 40 when the tongue is admitted to the buckle casing by turning lever 34 to enlarge the access opening. Strap 18 may be fixed to the tongue in a conventional manner, as by looping the strap about a bar of fastener 24 and stitching the overlapped parts of the strap together. The cooperation of buckle and tongue is conventional, lever 34 being turned to release the tongue when desired.

In accordance with the invention, a reel 44 is rotatably mounted upon the buckle-fastener, preferably within the buckle housing. The reel may comprise a central pin or hub 46 and a pair of end discs 48 between which strap 20 may be wound upon the hub. The size of the reel depends upon the amount of extra strap length required for adjustment purposes and upon the thickness of the strap material. The buckle end of strap 20 passes through an opening in the bottom wall 30 of the buckle housing and is fixed to the hub 46, as by placing the end in a slot of the hub and securing it there by rivets (not shown). The reel is spring biased so that it tends to rotate in the buckle housing to wind up strap 20. For this purpose the reel may be provided with a pair of spiral springs 50 (FIGS. 3 and 6) having their respective ends attached to the hub 46 and spring casings 52 (which may be part of the buckle housing), the hub 46 passing through the side walls of the buckle housing and the side walls of spring casings for appropriate rotational support. The direction of the spiral springs will depend upon the desired winding direction of the reel. In FIGURE 2 the reel winds clockwise. As illustrated in FIGURE 5, if separate spring housings are employed, tabs 54 of the housing may be inserted in associated slots of the side walls 28 to prevent rotation of the spring housings with the reel. In some instances a single spiral biasing spring may be employed. Other types of resilient biasing means may be utilized so long as the biasing means is stressed when the strap 20 is withdrawn from the reel.

From the foregoing description it is apparent that the reel will normally tend to retract the strap 20. Since one end of the strap is fixed to the floor, winding rotation of the reel will cause the buckle to move along the strap to the crotch of the seat. If the buckle is manually pulled from this position, the strap may be extended to the desired length, at which the buckle engages the tongue-fastener 24. If strap 20 were always extended to the same restricted length, the foregoing construction of the invention would suffice to provide a retractable strap having no slack. Such an arrangement would provide no adjustability of the strap length for different girth, because full extension of the strap would be required for safety. Nevertheless, this construction would have the significant advantage of automatic retraction without movement of the strap through the crotch of the seat during retraction or extension of the strap.

In accordance with further principles of the invention it is possible to provide the foregoing advantage without sacrificing adjustability of the strap and without subjecting the reel to collision forces. In the embodiment of FIGURE 2 this is accomplished by providing a releasable strap grip 56 comprising an abutment 58 extending between and fixed to the side walls 28 and an abutment 60 extending between and movable along the side walls 28. Abutment 60 is generally cylindrical but has reduced ends 62 (FIG. 5) which are preferably semicircular, the flat side facing the bottom wall 30 of the buckle housing. The reduced ends fit within slots 64 in the housing side walls and are free to move along the slots and even to tilt slightly. Slots 64 may be of rectangular configuration and extend generally longitudinally of the buckle housing. Because of the free fit of the reduced ends 62 in the slots 64, the abutment 60 is readily movable along the slots if a force is exerted on the abutment in the proper direction.

Abutment 58 has a roughened or knurled surface facing abutment 60. This surface may be slightly concave to complement the convex surface of abutment 60. Strap 20 passes around abutment 60, through the space between the abutments, and then past the lower surface of abutment 58 to the reel. The space between the lower surface of abutment 58 and the bottom wall 30 serves to guide the strap onto and off of the reel (see FIG. 4).

If abutment 60 is positioned slightly away from abutment 58, the strap 20 is free to move between the abutments and to wind onto the reel or to unwind therefrom. There will be little frictional impediment to the movement of the strap, because the strap will not engage the roughened surface of abutment 58. However, if abutment 60 is urged against abutment 58, the strap will be clamped therebetween with the assistance of the roughened surface, and the buckle housing will be effectively locked to the strap. It will be noted that the reel takes no part in this clamping action.

Assume that the buckle is located at the crotch of the seat, with the strap 20 retracted upon the reel. This is the position shown at the right side of FIGURE 1. If the buckle 26 is pulled so as to extend the belt, and is tilted so that the bottom wall 30 is inclined to the plane of the adjacent portion of strap 20, the strap will unwind from the reel against the bias of springs 50. Because of the orientation of the slots 64 with respect to the strap passing over the abutment 60 through the bottom wall 30, the abutment 60 will not be forced against abutment 58, and the strap will therefore move between the abutments with little impediment. When the strap 20 has been extended to the desired length, the tongue 25 of fastener 24 is inserted into the buckle so as to lock therewith as shown in FIGURE 2. The belt will now be in user-restraining position, forming a loop about the occupant of the vehicle as indicated at the left side of FIGURE 1. Slack in the strap will be taken up by the resiliently-biased reel, because as long as the strap 20 is not pulled taut, the strap may pass between abutments 58 and 60. However, when the seat belt is fastened about the user, strap 20 will be juxtaposed with the lower wall 30 of the buckle housing as shown in FIGURE 2, and any attempt to pull the housing so as to further extend the belt will result in the exertion of a force by the strap 20 upon the abutment 60 in a direction substantially along the slots 64 and will cause abutment 60 to be forced against the abutment 58 to clamp strap 20 therebetween. Further extension of the strap will be prevented. There will thus be in effect a tight nonextensible belt between the anchor brackets 22. This is the desired condition of the belt to insure its effectiveness in a collision.

If lever 34 is now moved to release the tongue 25 of fastener 24 and the tongue is withdrawn from the buckle, the strap 20 will be slackened, and abutment 60 will no longer be forced against abutment 58. The reel will rapidly retract strap 20, moving the buckle to its original position adjacent the crotch of the seat. This action is assisted by tilting the buckle housing with respect to the plane of the strap. If desired, the user may guide the buckle to its rest position.

The reel bias springs are made strong enough to pull the buckle along the strap as the strap is retracted. It is preferred that the buckle be formed of materials having no greater weight than is required for the desired strength, for example, high-tensile steel.

The tendency of abutment 60 to move toward abutment 58 is influenced by the orientation of slots 64 with respect to the longitudinal axis of the buckle housing and by the amount of friction between the strap and the abutment 60. By making the end of slots 64 adjacent abutment 58 somewhat closer to the bottom wall 30 than the other end of the slots, the force exerted on abutment 60 by strap 20 juxtaposed with the bottom wall will be directed more in line with the slots, and abutment 60 will have a greater tendency to move toward abutment 58. This tendency will also be increased if the surface of abutment 60 is slightly roughened (in addition to or instead of the roughened surface of abutment 58). However, such steps, while making it easier to clamp the strap, will make it more difficult to extend and retract the strap. By slighly recessing the roughened surface of abutment 58, the strap-retarding action of this abutment is minimized except when abutment 60 is actually urged against abutment 58. The surface of abutment 58 adjacent the lower wall 30 of the buckle housing may be smoothly rounded to serve as a low-friction guide for the movement of the strap, the path of the strap being chosen to facilitate such movement.

In the embodiment of the invention just described, only one strap of each belt is made retractable, the other strap being kept short to minimize the problem of a loose strap when not in use. This form of the invention requires that the retractable strap be longer and hence requires more reel storage space for that strap. As will now be described, both straps may be made retractable.

In FIGURE 7 the buckle 26 and strap 20 are shown in association with another fastener 66 and a strap 18A. The latter strap has one end attached to a floor anchor in the manner previously described but has a reel 68 associated with the fastener end. Reel 68 may be constructed in the same manner as reel 44 associated with the buckle fastener and may be resiliently biased in the same manner so as to wind the strap 18A. Fastener 66 has a housing 70 in which the reel is rotatably mounted, strap 18A passing through an opening in the bottom wall of the housing. An extension of the bottom wall forms tongue 25 of the type previously described. If strap 18A is kept somewhat shorter than strap 20, reel 68 may be smaller in diameter than reel 44. Strap 18A is made short enough so that full extension of strap 18A is always necessary in order to bring fastener 66 to its proper fastening position. There will thus be no slack in strap 18A after the fasteners are engaged. In the form shown, the construction of reel 68 must be strong enough to withstand collision forces and to prevent the end of strap 18A from being pulled off of the reel.

FIGURE 8 illustrates a modified form of the invention in which the fastener 86 is substantially the same as that illustrated in FIGURE 2, except that finger tabs 88 are attached to the ends 62 of the movable abutment 60, and the slots 64A are slanted to assist the clamping action as previously described. The movable abutment may be manipulated by the fingers of the user to facilitate releasing the strap clamp.

From the foregoing description it is apparent that the invention provides retractable seat belts which may employ conventional floor hardware, conventional strap materials, and fastener hardware which may be readily constructed by the application of techniques already utilized in the seat belt industry. The invention is applicable to existing seat belt installations as well as to custom or built-in installations.

While preferred embodiments of the invention have been shown and described, it will be apparent to those skilled in the art that changes can be made in these embodiments without departing from the principles and spirit of the invention, the scope of which is defined in the appended claims. For example, certain aspects of the various embodiments disclosed may be interchanged or combined in providing seat belts having one or more retractable straps. Accordingly, the foregoing embodiments are to be considered ilustrative, rather than restrictive of the invention, and those modifications which come within the meaning and range of equivalency of the claims are to be included therein. In this respect it should be noted that the reel may be located toward the front of the fastener, rather than the rear.

The invention claimed is:

1. A retractable seat belt comprising a fastener couple having a first fastener part free to move across the body of a user and releasably engageable with a mating second fastener part to place said belt in user-restraining position, said first fastener part having a casing with a front end for engaging said second fastener part, a rear end, and sides extending longitudinally between said ends, a spring-wound retraction reel supported upon said casing adjacent to its rear end for rotation about an axis transverse to the sides of said casing, and a strap having a first portion adapted to be anchored and a second portion secured to said reel for extension and retraction with respect to said casing when said first fastener part is moved along the strap away from and toward said first portion, respectively, means for preventing further extension of said strap from said casing when said strap has been extended to any selected length within a wide range of lengths and placed in user-restraining position, said extension-preventing means comprising a pair of abutments supported upon said casing transversely of the sides, one of said abutments being a pin supported forwardly of the other abutment for translational movement with respect to said casing toward and away from the other abutment, said casing having a bottom opening and said strap passing from said first portion through said opening, over said pin reversely from the front thereof, between said pin and the other abutment, and under the other abutment to said reel for exerting a force on said pin to move it toward the other abutment to clamp said strap when the strap below said casing has a rearward orientation along said casing, said strap being free of said casing between said first portion and said opening and having substantial play between front and rear edges of said opening, said casing being free to turn relative to the strap below said casing about a transverse axis substantially at said pin in order to modify the force upon said pin and to facilitate movement of said strap about said pin during desired extension and retraction of said strap, and said fastener couple having means movable independently of said extension-preventing means for releasing the engagement of said fastener parts and permitting said casing to move along said strap toward said first portion and thereby to retract said strap.

2. The retractable seat belt of claim 1, said sides of said casing having parallel longitudinal slots receiving the ends of said pin with freedom to move along the slots, said pin ends projecting exteriorly of said casing and having means for moving said pin away from the other abutment.

3. The retractable seat belt of claim 1, said means for releasing the engagement of said fastener parts comprising a lever supported upon said casing for pivotal movement about an axis transversely of said sides adjacent to the front end of said casing, said lever extending rearwardly over said casing and having spring means for biasing it to a position at which said fastener parts are held engaged.

4. A retractable seat belt comprising a fastener couple having a first fastener part free to move across the body of a user and releasably engageable with a mating second fastener part to place said belt in user-restraining position, said first fastener part having a casing with a front end for engaging said second fastener part, a rear end, and sides extending longitudinally between said ends, a spring-wound retraction reel supported upon said casing for rotation about an axis transverse to the sides of said casing, and a strap having a first portion adapted to be anchored and a second portion secured to said reel for extension and retraction with respect to said casing when said first fastener part is moved along the strap away from and toward said first portion, respectively, means for preventing further extension of said strap from said casing when said strap has been extended to any selected length within a wide range of lengths and placed in user-restraining position, said extension-preventing means comprising a pair of abutments supported upon said casing transversely of the sides, one of said abutments being a pin supported forwardly of the other abutment for translational movement with respect to said casing toward and away from the other abutment, said strap passing from said first portion into said casing, reversely around said pin from the front thereof, between said pin and the other abutment to said reel for exerting a force on said pin to move it toward the other abutment to clamp said strap when the strap exteriorly adjacent to said casing has a rearward orientation, means for releasing the clamping of said strap by said pin to facilitate movement of said strap about said pin during desired extension and retraction of said strap, and said fastener couple having means movable independently of said extension-preventing means for releasing the engagement of said fastener parts and permitting said casing to move along said strap toward said first portion and thereby to retract said strap.

5. The retractable belt of claim 4, said pin having exposed ends projecting from said sides of the casing, said means for releasing the clamping of said strap comprising means at said exposed ends for moving said pin away from said other abutment.

References Cited by the Examiner

UNITED STATES PATENTS

| | | | |
|---|---|---|---|
| 2,743,497 | 5/1956 | Davis | 24—196 |
| 2,798,539 | 7/1957 | Johnson | 297—388 |
| 2,822,595 | 2/1958 | Ruhl | 24—170 |
| 2,855,028 | 10/1958 | Matthews | 297—388 |
| 2,964,815 | 12/1960 | Sereno | 24—75 |
| 3,020,089 | 2/1962 | Monroe | 297—388 |
| 3,046,982 | 7/1962 | Davis | 128—134 |
| 3,116,092 | 12/1963 | Spanger | 297—388 |
| 3,125,374 | 3/1964 | Bissell | 297—388 |

FOREIGN PATENTS

| | | |
|---|---|---|
| 1,179,105 | 12/1958 | France. |
| 175,676 | 10/1906 | Germany. |

FRANK B. SHERRY, *Primary Examiner.*